United States Patent [19]

Johnson

[11] 4,136,605

[45] Jan. 30, 1979

[54] VAN ROOF VENTILATOR

[76] Inventor: Curtis D. Johnson, 38 Michael Pl., Levittown, Pa. 19057

[21] Appl. No.: 842,348

[22] Filed: Oct. 14, 1977

[51] Int. Cl.² .............................................. B60H 1/24
[52] U.S. Cl. .................................... 98/2.18; 98/42 R; 55/95; 55/385 B
[58] Field of Search ...................... 98/2.18, 2.11, 2.14, 98/2.15, 70, 78, 42; 261/DIG. 4; 55/95, 223, 244, 385 B; 52/198-260

[56] References Cited

U.S. PATENT DOCUMENTS

| 853,619 | 5/1907 | Baldwin | 55/95 |
|---|---|---|---|
| 1,518,319 | 12/1924 | Freeman et al. | 98/2.18 |
| 1,983,979 | 12/1934 | Graham | 98/2.14 |
| 2,172,939 | 9/1939 | Lintern et al. | 98/2.14 |
| 2,553,881 | 5/1951 | Suttles | 98/2.18 |
| 2,719,475 | 10/1955 | Royall | 98/2.15 |
| 3,199,307 | 8/1965 | Willis | 98/2.11 |
| 3,745,745 | 7/1973 | Mane | 55/95 |

Primary Examiner—Henry C. Yuen
Attorney, Agent, or Firm—Daniel Jay Tick

[57] ABSTRACT

An opening is formed through the roof of a van. A sealed airtight air chamber is affixed to the roof inside the van and completely covers an area surrounding the opening. A watertight container is mounted in the air chamber beneath the opening in the roof for collecting rain falling through the opening. Air exhaust hosing extends from the air chamber to the roof and floor inside the van.

3 Claims, 4 Drawing Figures

VAN ROOF VENTILATOR

BACKGROUND OF THE INVENTION

The present invention relates to a van roof ventilator. More particularly, the invention relates to a van roof ventilator for a van having a body with a floor, a roof and sides.

Objects of the invention are to provide a van roof ventilator of simple structure, which is inexpensive in manufacture, installed with facility and convenience in new and existing vehicles, and functions efficiently, effectively and reliably to exhaust cool air from the area of the floor of the van and warm air from the area of the roof of the van.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
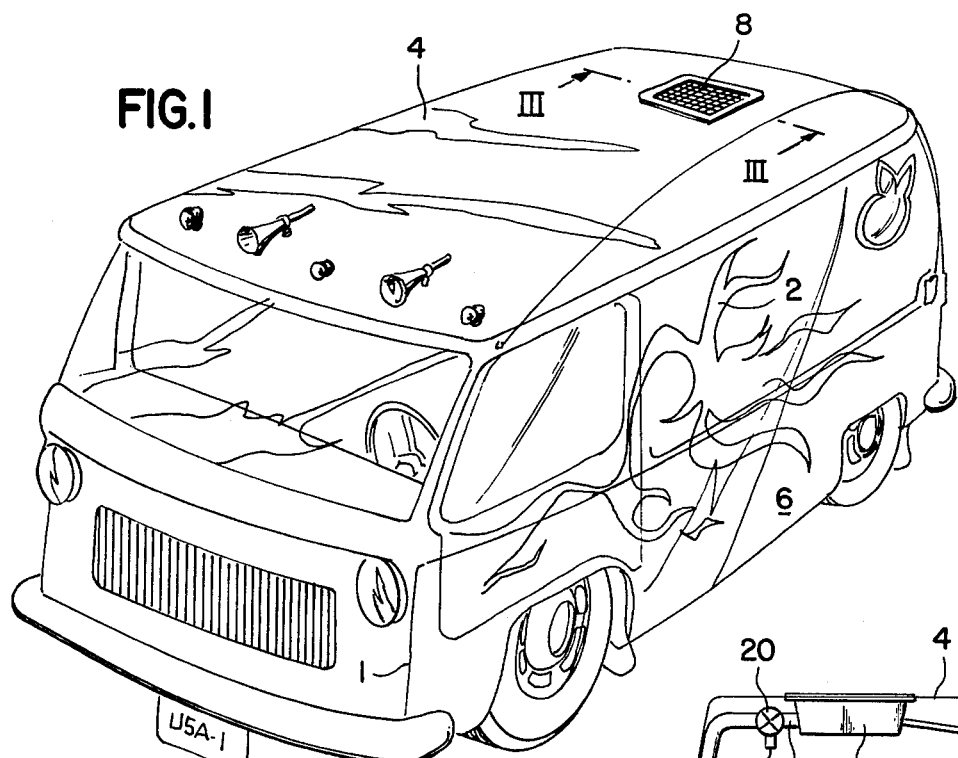
FIG. 1 is a view of an embodiment of the opening of the van roof ventilator of the invention.
Figure 2:
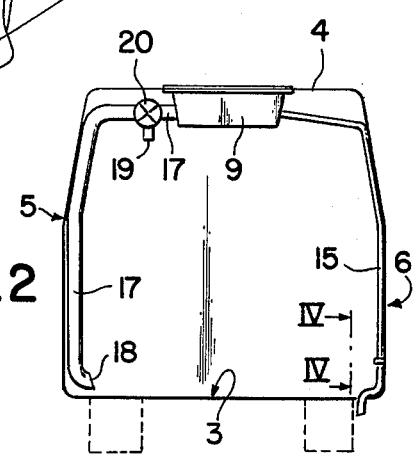
FIG. 2 is a schematic diagram, on a reduced scale, of an embodiment of the van roof ventilator of the invention.

The van roof ventilator of the invention is for a van 1 having a body 2 (FIG. 1) with a floor 3 (FIGS. 2 and 4), a roof 4 (FIGS. 1 to 3), and sides 5 and 6 (FIG. 2).

Figure 3:
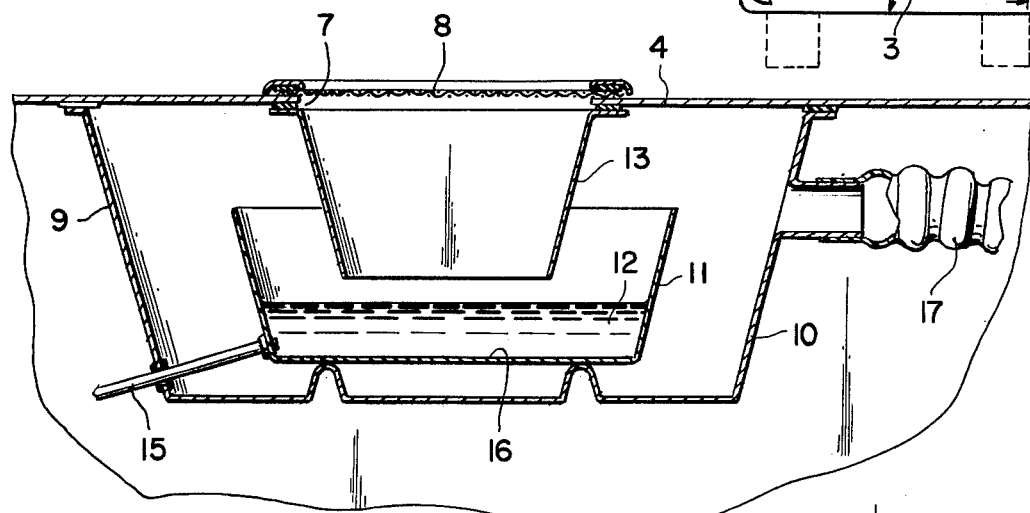
FIG. 3 is a view, on an enlarged scale, partly in section, of an embodiment of the air chamber and watertight container of the van roof ventilator of the invention, taken along the lines III—III, of FIG. 1.

The van roof ventilator of the invention comprises an opening 7 formed through the roof 4 of the van, as shown in FIG. 3. If desired, a screen 8 may be utilized to cover the hole 7 in the roof of the van, as shown in FIGS. 1 and 3.

A sealed airtight air chamber 9 is affixed to the roof 4 inside the van 1 and completely covers an area surrounding the opening 7 (FIGS. 2 and 3). The air chamber 9 has a wall 10 (FIG. 3).

A watertight container 11 is mounted in the air chamber 9 beneath the opening 7 in the roof 4 for collecting rain 12 falling through said opening (FIG. 3). The rain 12 is directed into the watertight container 11 via a funnel-type member 13 surrounding the opening 7 and extending from the opening into said watertight container, as shown in FIG. 3.

Figure 4:
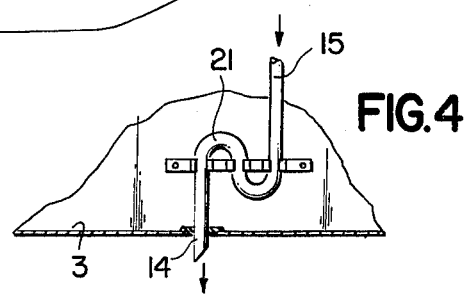
FIG. 4 is a view, on an enlarged scale, taken along the lines IV—IV, of FIG. 2.

An exhaust hole 14 is formed through the floor 3 of the van (FIG. 4).

A water exhaust hose 15 (FIGS. 2 to 4) extends from the bottom 16 of the watertight container 11 through the wall 10 of the air chamber 9 in an airtight manner to the exhaust hole 14 from the floor 3 of the van (FIGS. 3 and 4).

An air exhaust hose 17 extends through the wall 10 of the air chamber 9 in an airtight manner to an open end 18 (FIG. 2) near the floor 3 in the van for exhausting air from the van via said air chamber, as shown in FIGS. 2 and 3. The air exhaust hose 17 has an opening 19 therein near the roof 4 of the van, as shown in FIG. 2. A switch valve 20 is provided in the air exhaust hose 17 at the opening 19 therein, as shown in FIG. 2, for selectively directing cool air from the area of the floor 3 of the van, via the open end 18 thereof, and warm air from the area of the roof of the van, via the opening 19 thereof, into the air chamber 9 whence it is exhausted into the atmosphere via the opening 7.

As shown in FIG. 4, an S-trap 21 is formed in the water exhaust hose 15 near the floor 3 of the van to prevent exhaust gases of the van from entering said van. This is achieved by rain water remaining in the S-trap and acting to prevent the seepage of exhaust gases into the van via the water exhaust hose 15.

While the invention has been described by means of a specific example and in a specific embodiment, I do not wish to be limited thereto, for obvious modifications will occur to those skilled in the art without departing from the spirit and scope of the invention.

Ventilators of the type described in the present application are disclosed in the following U.S. Pat. Nos. 1,518,319, issued to Freeman et al on Dec. 9, 1924, No. 1,550,503, issued to Coffman on Aug. 18, 1925, No. 1,606,410, issued to Frame on Nov. 9, 1926, No. 1,744,177, issued to Schuler on Jan. 21, 1930, No. 1,762,244, issued to Russel on June 10, 1930, No. 2,115,432, issued to Simon on Apr. 26, 1938, No. 2,173,890, issued to Tottle on Sept. 26, 1939, No. 2,294,363, issued to Brockway on Sept. 1, 1942, No. 2,550,353, issued to Hopfinger on Apr. 24, 1951, No. 2,577,836, issued to Willson on Dec. 11, 1951, No. 2,939,375, issued to Herman on June 7, 1960, No. 3,299,794, issued to Castelet on Jan. 24, 1967, No. 3,696,732, issued to Rodgers on Oct. 10, 1972, No. 3,888,165, issued to Hattass et al on June 10, 1975, No. 3,926,100, issued to Bermanseder et al on Dec. 16, 1975 and No. 3,934,383, issued to Perry et al on Jan. 27, 1976.

I claim:

1. A van roof ventilator for a van having a body with a floor, a roof and sides, said van roof ventilator comprising
an opening formed through the roof of the van;
a sealed airtight air chamber affixed to the roof inside the van and completely covering an area surrounding the opening, said air chamber having a wall;
a watertight container mounted in the air chamber beneath the opening in the roof for collecting rain falling through said opening;
an exhaust hole formed through the floor of the van;
a water exhaust hose extending from the bottom of the watertight container through the wall of the air chamber in an airtight manner to the exhaust hole in the floor of the van;
an air exhaust hose extending through the wall of the air chamber in an airtight manner to an open end near the floor in the van for exhausting air from the van via the air chamber, said air exhaust hose having an opening therein near the roof of the van; and
a switch valve in the air exhaust hose at the opening therein for selectively directing cool air from the area of the floor of the van and warm air from the area of the roof of the van into the air chamber.

2. A van roof ventilator as claimed in claim 1, further comprising an S-trap formed in the water exhaust hose near the floor of the van to prevent exhaust gases of the van from entering the van.

3. A van roof ventilator as claimed in claim 1, further comprising a screen covering the hole in the roof of the van.

* * * * *